United States Patent [19]

Ando et al.

[11] Patent Number: 4,831,563

[45] Date of Patent: May 16, 1989

[54] METHOD OF PROCESSING OUTPUT DATA FROM GEOMAGNETIC SENSOR

[75] Inventors: Hitoshi Ando; Takashi Kashiwazaki; Masayuki Hosoi, all of Saitama, Japan

[73] Assignee: Pioneer Electronic Corporation, Tokyo, Japan

[21] Appl. No.: 68,296

[22] Filed: Jul. 1, 1987

[30] Foreign Application Priority Data

Jul. 1, 1986 [JP] Japan ................................. 61-155698
Jul. 1, 1986 [JP] Japan ................................. 61-155701

[51] Int. Cl.$^4$ ............................................. G01C 17/38
[52] U.S. Cl. ................................. 364/571.05; 364/457; 33/356
[58] Field of Search ............... 364/424, 426, 449, 454, 364/457, 550, 565, 571.01, 571.05; 324/260; 33/356, 357

[56] References Cited

U.S. PATENT DOCUMENTS

| | | | |
|---|---|---|---|
| 4,429,469 | 2/1984 | Tsushima et al. | ...................... 33/356 |
| 4,497,026 | 1/1985 | Braschel et al. | ...................... 364/426 |
| 4,555,761 | 11/1985 | Matsumoto et al. | .................. 33/356 |
| 4,660,161 | 4/1987 | Okada | ................................. 364/457 |
| 4,663,629 | 5/1987 | Tagami et al. | ....................... 364/449 |
| 4,669,046 | 5/1987 | Kubo | ..................................... 364/565 |
| 4,670,852 | 6/1987 | Masaki et al. | ......................... 364/565 |
| 4,673,878 | 6/1987 | Tsushima et al. | ................... 364/449 |
| 4,686,772 | 8/1987 | Sobel | ..................................... 33/356 |
| 4,688,176 | 8/1987 | Hirata | .................................. 364/449 |
| 4,718,013 | 1/1988 | Kubo | ..................................... 364/565 |

*Primary Examiner*—Gary Chin
*Attorney, Agent, or Firm*—Sughrue, Mion, Zinn, Macpeak & Seas

[57] ABSTRACT

A geomagnetic sensor used for vehicle-mount navigational apparatus outputs data indicative of the vehicle's direction. If the output data from the geomagnetic sensor is out of a predetermined range, the data is replaced by predetermined data or corrected on the basis of the predetermined data.

5 Claims, 5 Drawing Sheets

METHOD OF PROCESSING OUTPUT DATA FROM GEOMAGNETIC SENSOR

BACKGROUND OF THE INVENTION

1. Field of the Invention

The present invention relates to a method of processing output data from a geomagnetic sensor.

2. Background of the Invention

Active R&D efforts are being conducted today on vehicle-mount navigational apparatus which directs a vehicle to its destination by reading map information from a memory and displaying it on a display device together with the present location of the vehicle. One of the indispensable components of this navigational apparatus is a direction sensor for detecting the direction of the vehicle. The direction sensors proposed thus far are geomagnetic sensor which detect the position of the vehicle based on geomagnetism (i.e., the earth's magnetic field). One of the major problems of this geomagnetic sensor is its high susceptibility to disturbances from external magnetic fields. When the vehicle passes a railroad crossing or an iron bridge or when a larger car (e.g. a truck or bus) passes by the vehicle, the sensor will produce an output containing a significant error.

SUMMARY OF THE INVENTION

An object, therefore, of the present invention is to provide a method of processing output data from a geomagnetic sensor in such a manner that the output will have sufficient reliability to enable correct detection of the vehicle's direction.

According to the method of the present invention, a permissible range over which the output data of a geomagnetic sensor is allowed to vary is set and if specific output data from the geomagnetic sensor is outside the scope of this range, the data is replaced by predetermined data or corrected on the basis of said predetermined data.

DETAILED DESCRIPTION OF THE PREFERRED EMBODIMENTS

A preferred embodiment of the present invention is hereinafter described with reference to the accompanying drawings.

Figure 1:
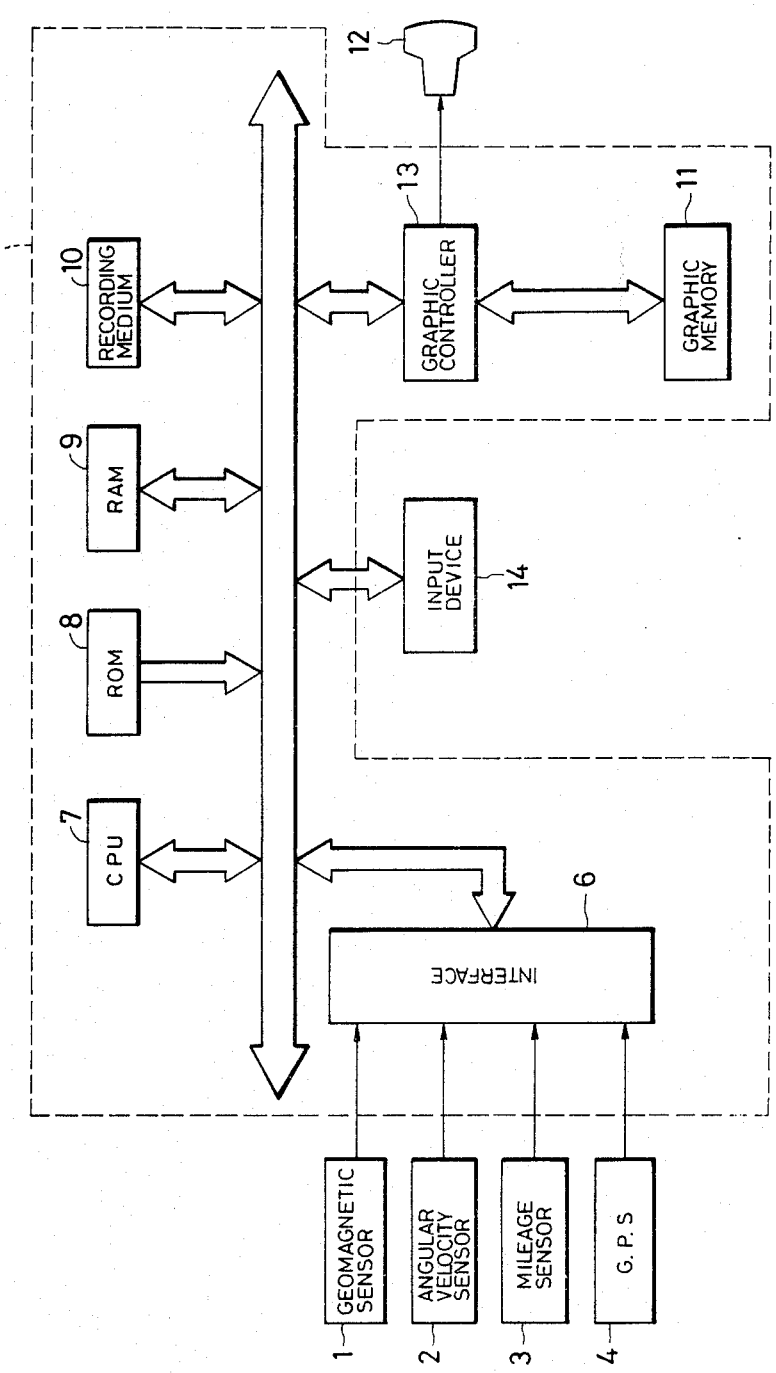
FIG. 1 is a block diagram showing the construction of a vehicle-mount navigational apparatus to which the method of the present invention for processing the output data of a geomagnetic sensor is applied.

FIG. 1 is a block diagram showing the construction of a vehicle-mount navigational apparatus to which the method of the present invention is applied. In the figure, 1 is a geomagnetic sensor for producing vehicle direction data based on geomagnetism; 2 is an angular velocity sensor for detecting the angular velocity of the vehicle; 3 is a mileage sensor for detecting the distance covered by the vehicle; 4 is a GPS (global positioning system) for detecting the present location of the vehicle based on such information as the latitude and longitude; and 5 is a system controller which is supplied with the output from each of the sensors 1 to 4.

The system controller 5 is composed of the following components: an interface 6 that is fed an output from each of the sensors 1 to 4 for performing such operations as A/D (analog/digital) conversion; a CPU (central processing unit) 7 that processes various kinds of video data and which performs arithmetic operations to determine the traveling distance of the vehicle and other items based on the output data of the sensors 1 to 4, which are successively sent from the interface 6; a ROM (read-only memory) 8 into which have been written the various programs to be executed by CPU 7 and any other necessary information; a RAM (random-access memory) 9 which permits writing and reading of the information necessary for executing such programs; a recording medium 10 in the form of a device such as a CD-ROM or IC card and on which has been recorded digitized map information; a graphic memory 11 that is typically in the form of a V-RAM (video RAM), and a graphic controller 13 that controls graphic data as such the map being sent from CPU 7 in a manner such that it is written into the graphic memory 11 and displayed on a display 12 such as a CRT. An input device 14 consists of a keyboard and other necessary components. The operator depresses keys to supply the system controller 5 with various commands and other input data.

Figure 2:
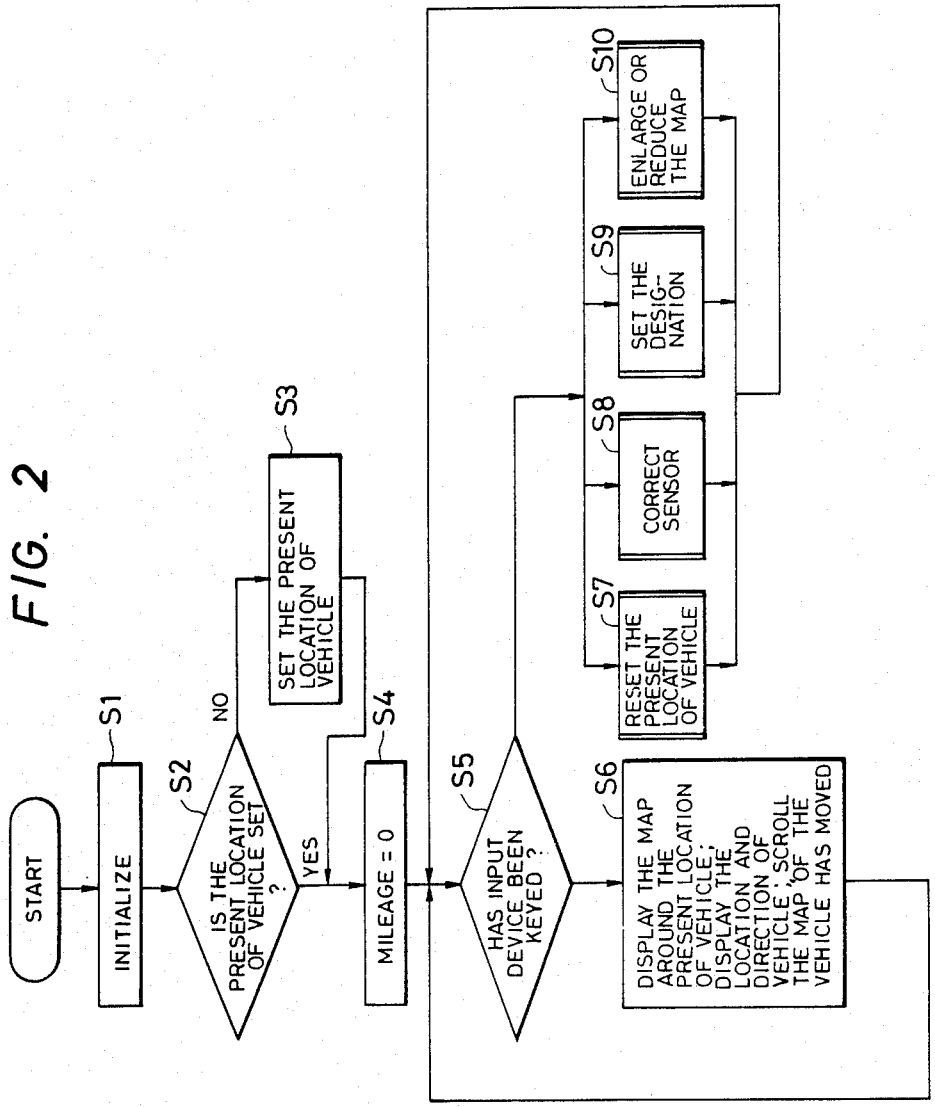
FIGS. 2 and 3 are each a flowchart showing the basic steps to be executed by the CPU in FIG. 1.

The basic steps to be executed by CPU 7 are hereunder explained with reference to the flowchart of FIG. 2.

The first step to be taken by CPU 7 is initialization for starting program execution (step S1). CPU 7 then checks whether the present location of the vehicle has been set (step S2). If it is found that the present location of the vehicle has not been set, the present-location set routine is executed (step S3) by, for example, keying the input device 14 to set the present location of the vehicle. In the next step, the mileage is reset to zero (step S4) and CPU 7 checks whether the input device 14 has been keyed (step S5).

In the absence of keying, CPU 7 causes a map of the area around the present location of the vehicle to be displayed on the display 12 while at the same time, it displays on the map the present location of the vehicle and its direction by, for example, a vehicle mark. If the vehicle has traveled a certain distance, CPU 7 scrolls the map by the coresponding amount. Furthermore, if the position of the vehicle is about to leave the scope of the map data presently written in the graphic memory 11, CPU 7 reads the necessary map data out of the recording medium 10 and displays it on the display 12 (step S6).

In the presence of keying, CPU 7 executes the routine of present-location resetting (step S7), sensor correction (step S8), designation setting (step S9) or map enlargement or reduction (step S10) depending upon the input data.

Figure 3:
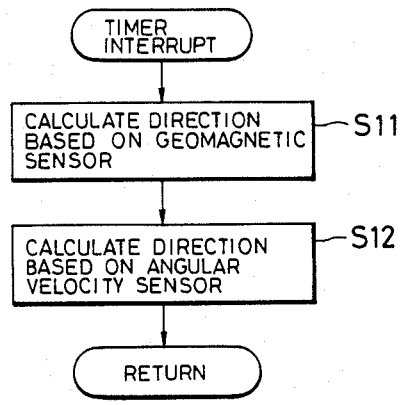

As shown in FIG. 3, CPU 7, in response to an interrupt by a timer, continually calculates the direction of the vehicle at given time intervals based on the output data from each of the geomagnetic sensor 1 and the angular velocity sensor 2 (steps S11 and S12).

Figure 4:
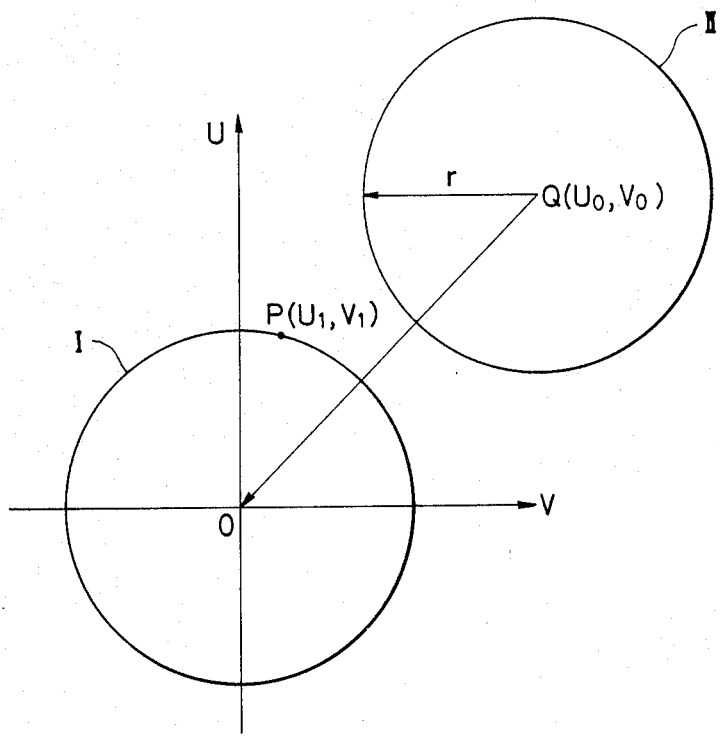
FIG. 4 is a diagram showing the loci to be described by the output data of a geomagnetic sensor.

The geomagnetic sensor 1 is generally composed of a pair of magnetism detecting elements arranged in the same plane and which are spaced from each other by a phase angle of 90°, one element detecting a geomagnetic component in a certain direction, say, the U direction (toward north) and the other element detecting the geomagnetic component in the V direction (toward east). If a geomagnetic sensor 1 having such a construction is rotated by one turn in a horizontal plane, the output data from the detecting elements for the U and V directions will describe a locus that is a circle I with its center located at the origin O of a U-V rectangular coordinate system as shown in FIG. 4. Therefore, the azimuth $\theta$ of a certain point, say point ($U_1$, $V_1$), measured from north (U-axis) in a clockwise direction can be calculated by the following equation (1):

$$\theta = \tan^{-1}(U/V) \qquad (1)$$

If the geomagnetic sensor 1 is installed on the vehicle at a given angle with respect to its longitudinal or transverse direction, the direction of the vehicle can be detected by obtaining output data from the detecting elements for the U and V directions and by substituting the data in equation (1).

Ideally, the geomagnetic sensor 1 should be surrounded only by the flux due to the earth's magnetic field but in fact, the vehicle usually contains unwanted magnetic flux originating from such sources as magnetization of the steel plates of which the car body is made. One method proposed for achieving correct detection of the direction of a vehicle by eliminating the effects of a magnetized car body is described in Unexamined Published Japanese Patent Application No. 28208/1982. If the magnetism detecting elements for the U and V directions are fixed to the vehicle so that there will be no relative displacement between the two elements, the effects of the magnetized car body are materialized in the distance between the origin of the U-V rectangular coordinate system and the center of the circle described by plotting the output produced as a result of rotating the detecting elements through one turn. Based on this fact, the method described in Unexamined Published Japanese Patent Application No. 28208/1982 eliminates the effects of the magnetized car body by correcting the output data from the two detecting elements in such a way that the center of the circle defined above will be shifted to the origin of the U-V coordinate system. This method is described more specifically below. The circle described by the outputs of the two detecting elements has its center Q offset by a certain distance from the origin (see II in FIG. 4). If the maximum values (Umax, Vmax) and minimum values (Umin, Vmin) of the outputs U and V of the two detecting elements are determined, the coordinates of the center Q can be calculated from these values by the following equations (2):

$$Uo = (Umax + Umin)/2$$

$$Vo = (Vmax + Vmin)/2 \qquad (2).$$

Using the calculated values Uo and Vo, the output values U and V of the respective magnetism detecting elements are corrected by the following equations (3), and the corrected values U' and V' are used to calculate the correct direction of the vehicle:

$$U' = U - Uo$$

$$V' = U - Vo \qquad (3).$$

Figure 5:
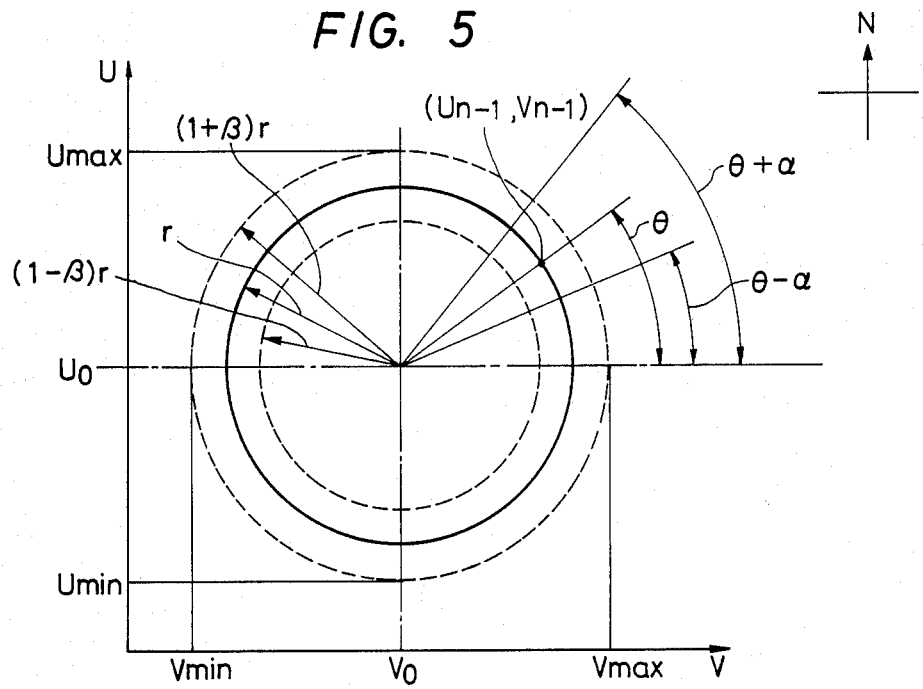
FIG. 5 is a diagram showing the case in which a window is set in the locus described by the output data of a geomagnetic sensor.

Further in accordance with the present invention, the reliability of output data from the geomagnetic sensor 1 is increased by setting, according to a certain rule, a permissible range over which the output data of the sensor is allowed to vary (this permissible range is hereinafter referred to as a window). As shown by the hatched area in FIG. 5, a window is set in an angular direction, with the direction data ($U_{n-1}$, $V_{n-1}$) obtained by the detection that immediately precedes the present detection being used as a reference. According to the present invention, the difference between the preceding data and the direction data obtained by the present detection is constantly monitored and if the latter data differs so greatly from the previous data as to go outside the scope of the window, the data obtained by the present detection is regarded as an error and replaced by predetermined data such as the immediately preceding data or the average of the data obtained by several previous detections (the number of the previous detections to be selected may be of any value), with the result that the reliability of the output data from the geomagnetic sensor 1 is increased. Mathematically, the data delivered from the geomagnetic sensor 1 fits the equation of a circle, so any data that does not satisfy this equation can also be regarded as an error. Since the data from the sensor 1 fluctuates because of such factors as errors in A/D conversion, the window is set such that it has a certain allowance not only in the angular direction but also in the radial direction. In FIG. 5, $\alpha$ denotes the permissible range of angle, and $\beta$ the permissible range of radius.

The difference in the direction of the vehicle varies with the time interval at which direction data is obtained, so it is possible to determine a specific direction of the vehicle in terms of the relationship between the car speed and its angular velocity. Assume, for example, a maximum angular velocity of 30 (degrees/sec) for a car speed of 40 (km/h). If the output data from the geomagnetic sensor 1 exceeds the scope of this range, it is regarded as an error and replaced with the immediately preceding data or the average of the data obtained via several previous detections. If the window is varied in terms of angle, the latter may be set in accordance with the change in car speed. The angle may be varied as a linear function of car speed; alternatively, a certain amount of hysteresis may be introduced in order to avoid the need to frequently change the angle according to every change in the car speed.

Figure 6:
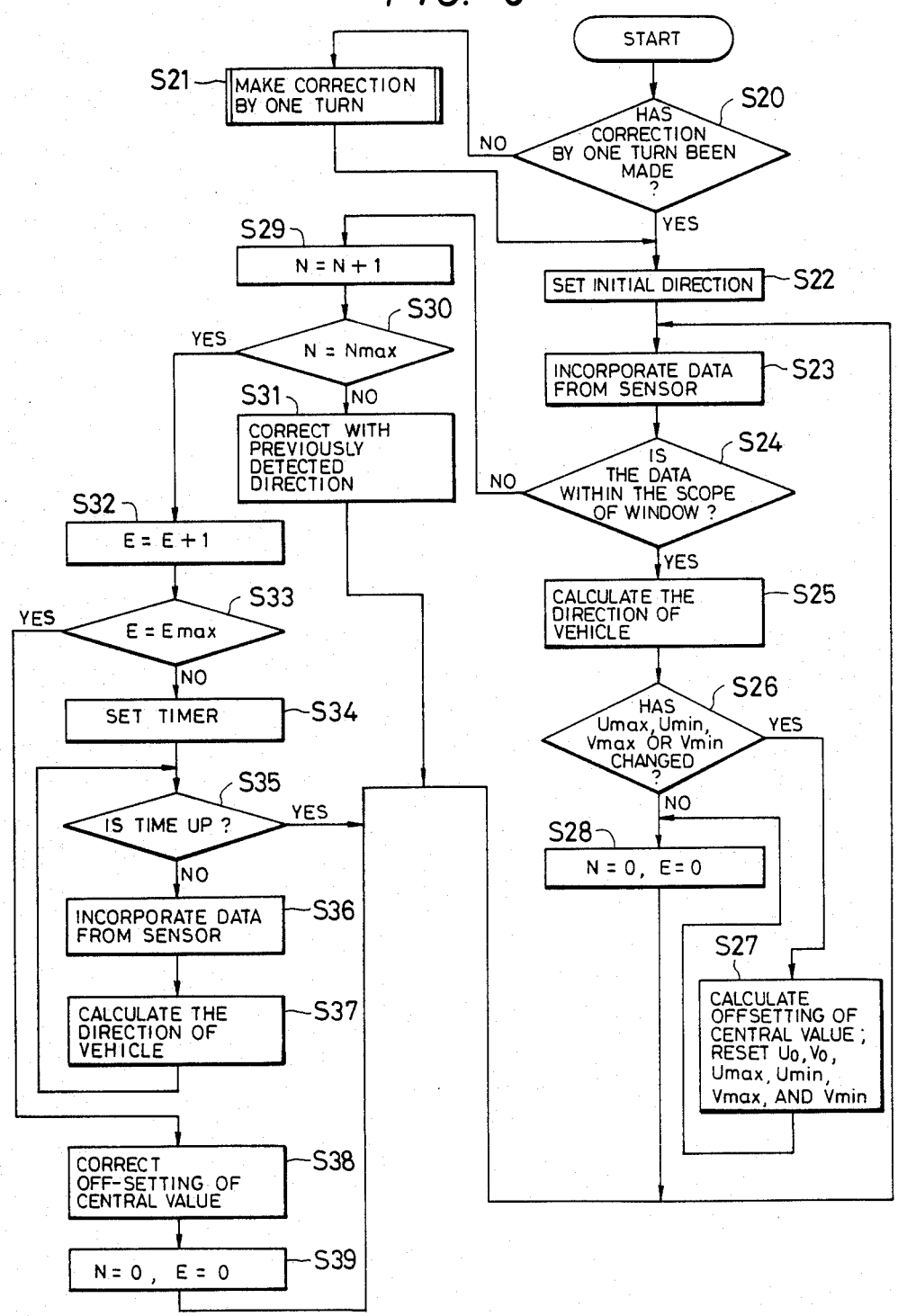
FIG. 6 is a flowchart showing the sequence of steps to be executed by the CPU in FIG. 1 in accordance with the method of the present invention for processing the output data of a geomagnetic sensor.

The sequence of the steps to be executed by CPU 7 in accordance with the method of the present invention for processing the output data of geomagnetic sensor 1 is hereinafter described with reference to the flowchart of FIG. 6.

First, CPU 7 performs checks whether the step of so-called "one rotation correction" has been completed (step S20). If it is found that this correction step has not been completed, CPU 7 executes the correction routine (step S21). In this routine the vehicle carrying the geomagnetic sensor 1 is rotated by one turn to determine the values of Uo and Vo (central values), Umax (maximum value in the direction toward north or south), Umin (minimum value in the direction toward north or south), Vmax (maximum value in the direction toward east or west), Vmin (minimum value in the direction toward east or west), and radius r. The values determined are stored in RAM 9.

In the next step, CPU 8 sets the initial direction (step S22). At engine start up, the vehicle is at rest and its direction must be constant. Therefore, the initial value of the vehicle's direction is preferably set at the time of engine startup. After setting the initial direction, CPU 7 incorporates the output data of the geomagnetic sensor 1 (step S23) and checks whether the incorporated data is within the scope of the already defined window (the hatched area in FIG. 5) (step S24). If the data is within the scope of the window, CPU 7 calculates the direction of the vehicle from the output data of sensor 1 using equations (1) to (3) (step S26). The calculated direction of the vehicle is displayed on the display 12 together with the map (step S6 in the flowchart of FIG. 2).

When the vehicle moves, the geomagnetic sensor 1 may produce output data containing a dc (direct-current) component as a result of regional change in the location of the vehicle, although the amount of this component is not as large as the magnetization of the car body. This dc component can cause "off-centering", a phenomenon in which the coordinates of the center of the equation of the circle shifts. In order to solve this problem, the following procedures may be employed: CPU 7 checks whether the incorporated output data of the geomagnetic sensor 1 is greater than Umax or Vmax stored in RAM 9 or whether it is smaller than Umin or Vmin also stored in RAM 9, and checks to see if any variation has occurred in Umax, Umin, Vmax or Vmin (step S26). If the result is affirmative, CPU 7 considers that off-centering has occurred, and, assuming the lack of change in the radius r, CPU 7 is capable of altering the geometric center of the circle according to the amount of the change that has occurred in one of values mentioned above, and based on the corrected circle, CPU 7 determines new values of Uo, Vo, Umax, Umin, Vmax and Vmin by calculation, thereby updating the values stored in RAM 9 (step S27). After step S26 or S27, both the count N of a window error counter which counts the number of occasions in which the output data of the geomagnetic sensor 1 has gone outside the scope of the window, and the count E of an off-center identifying counter which counts the number of occasions in which off-centering (i.e., offsetting of the central value) has occurred, are reset to zero (step S28), the sequence thereafter returning to step S23. The operational flow described above is that of normal operation for the case in which the output data of the geomagnetic sensor 1 is confined within the scope of the window without being disturbed by an external magnetic field.

If the output data of the geomagnetic sensor 1 is not within the scope of the window, CPU 7 increases the count N of the window error counter by an increment of "1" (step S29) and subsequently checks to see if N has reached a maximum window error value Nmax (step S30). Until this maximum value is reached, CPU 7 regards the incorporated output data of sensor 1 as an error and corrects it using the preceding value of the output data of sensor 1 or the direction data obtained on the basis of the average of data obtained by several previous detections (step S31), the sequence thereafter returning to step S23.

If the count N of the window error counter has reached its maximum value Nmax, CPU 7 increases the count E of the off-center identifying counter by an increment "1" (step S32) and subsequently checks to see if E has reached a maximum value of off-center identification Emax (step S33). Until this maximum value is reached, a timer having a set time out period is set (step S34) and CPU 7 incorporates the output data of sensor 1 until the designated elapsed time is registered in step S35 (step S36), with direction calculation being subsequently made on the basis of the incorporated data (step S37). In other words, if the output data of the geomagnetic sensor 1 remains outside the scope of the window for a predetermined period, the window is released temporarily and no action is taken to correct the error for a given period. This prevents overreaction of the system even when it is fed unusual data such as when the vehicle is being steered to make an extremely sharp turn.

Figure 7:
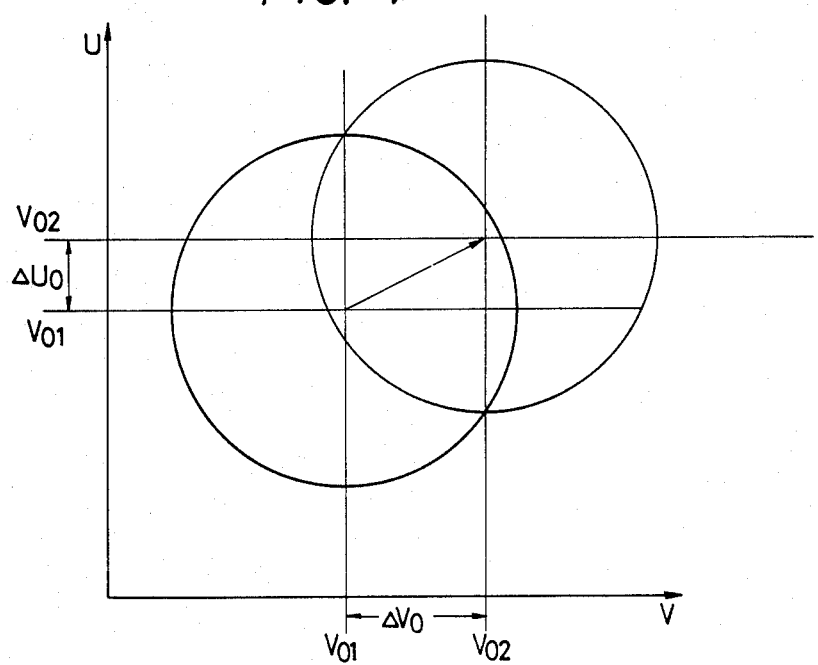
FIG. 7 is a diagram showing the case in which the locus described by the output data of a geomagnetic sensor has become off-centered, or offset in its central value.

If the count E of the off-center identifying counter has reached its maximum value Emax, CPU 7 considers that off-centering has occurred and uses other data to correct this defect (step S38) and resets both N and E to zero (step S39), the sequence thereafter returning to step S23. If the vehicle passes a railroad crossing, its body is magnetized by the strong magnetic field at the crossing and this introduces a dc component into the output data being delivered from the sensor 1, which causes off-centering as depicted in FIG. 7 and makes subsequent detection of the correct direction of the vehicle impossible. If such off-centering occurs as a result of the magnetization of the car body, the output of the sensor 1 will never fall within the scope of the window and CPU 7 will conclude that the car body has become magnetized by counting the number of instances in which the output data of the sensor 1 has failed to fall within the scope of the window for a predetermined period of time. It should, however, be noted that even if the output data of the sensor 1 contains a dc component, it is the coordinates of the center of the equation of the circle, not the radius r of the circle, that will vary (the radius r will not vary unless the strength of geomagnetism changes). Therefore, offsetting of the center value (i.e., off-centering) can be corrected by determining the coordinates of the correct center based on other data.

An example of the "other data" that can be used for the purpose of correcting for off-centering is the output data of the angular velocity sensor 2. The absolute value of the angle cannot be determined using the angular velocity sensor 2 alone but it can be obtained by integration on a time basis. The values that are known in the case of off-centering are the output data (U, V) of the geomagnetic sensor 1, the radius r which has been determined by "rotation correction", and the output data of the angular velocity sensor 2, and these values can be correlated with one another using the following equations (4):

$$U = r \cdot \sin \theta + U_o$$

$$V = r \cdot \cos \theta + V_o \qquad (4).$$

Equations (4) can be rewritten into the following equations (5):

$$U_o = U - r \cdot \sin \theta$$

$$V_o = V - r \cdot \cos \theta \qquad (5).$$

Therefore, the present central values (Uo, Vo) can be determined by equations (5).

Another method that can be employed to determine the angle is to calculate, with the aid of map data, the angle of the road on which the vehicle is running, with the calculated angle of the road being used as angle $\theta$. In other words, the road is represented by a series of lines (segments of a line) connecting two points. Since a group of points have been digitized and stored in the recording medium 10 as map data, the latter can be used to determine the values at ends (two points) of the segment of a line on which the vehicle is presently located. Based on these values, the slope of the linear function for the segment and, hence, the angle $\theta$ of the road, can be calculated.

As described in the foregoing, the method of the present invention increases the reliability of the output data of a geomagnetic sensor so greatly that the direction of a vehicle can be correctly detected despite disturbances from an external magnetic field.

What is claimed is:

1. A method of processing the output data of a geomagnetic sensor mounted on a vehicle for producing data indicating the direction of said vehicle on the basis of geomagnetism, comprising the steps of:
    (a) sampling output data of said geomagnetic sensor at a predetermined rate;
    (b) determining a permissible range of variance of said output data from sample to sample, said range being determined in accordance with the maximum angular velocity of said vehicle at at least one linear speed;
    (c) detecting whether a most recent sample of said output data varies from an immediately preceding sample by an amount outside of said permissible range, and, in this event,
    (d) replacing said most recent sample with one of:
        (i) the immediately preceding sample; and
        (ii) an average of plural preceding samples.

2. A method is claimed in claim 1, further including an initial step of calibrating said geomagnetic sensor by rotating said sensor through one complete turn.

3. A method of processing the output data of a geomagnetic sensor mounted on a vehicle for producing data indicating the direction of said vehicle on the basis of geomagnetism, comprising the steps of:
    (a) sampling output data of said geomagnetic sensor at a predetermined rate;
    (b) determining a permissible range of variance of said output data from sample to sample;
    (c) detecting whether successive samples of said output data vary from an immediately preceding sample by an amount outside of said permissible range; and
    (d) if said successive samples fall outside of said permissible range in a predetermined number of successive detections, redetermining a base coordinate system for said geomagnetic sensor on the basis of independently measured direction data.

4. A method according to claim 3 wherein said independently measured data includes the output data of an angular velocity sensor for detecting the angular velocity of said vehicle.

5. A method according to claim 3 wherein said independently measured data includes map data including the positions of at least two points on the road on which said vehicle is running, one of said points being ahead of the vehicle and the other being behind the vehicle.

* * * * *